United States Patent
Sage et al.

(10) Patent No.: US 11,132,407 B2
(45) Date of Patent: Sep. 28, 2021

(54) SYSTEM FOR THE AUTOMATIC SEPARATION OF DOCUMENTS IN A BATCH OF DOCUMENTS

(71) Applicant: Esker, Inc., Middleton, WI (US)

(72) Inventors: Clement Sage, Savas (FR); Jeremy Espinas, Lyons (FR); Cedric Viste, Ecully (FR); Jean-Jacques Berard, Villeurbanne (FR)

(73) Assignee: ESKER, INC., Middleton, WI (US)

( * ) Notice: Subject to any disclaimer, the term of this patent is extended or adjusted under 35 U.S.C. 154(b) by 564 days.

(21) Appl. No.: 15/824,663

(22) Filed: Nov. 28, 2017

(65) Prior Publication Data
US 2019/0163750 A1    May 30, 2019

(51) Int. Cl.
| | |
|---|---|
| *G06F 16/93* | (2019.01) |
| *G06T 5/00* | (2006.01) |
| *G06N 3/08* | (2006.01) |
| *G05B 13/04* | (2006.01) |

(52) U.S. Cl.
CPC .......... *G06F 16/93* (2019.01); *G05B 13/048* (2013.01); *G06N 3/08* (2013.01); *G06T 5/001* (2013.01)

(58) Field of Classification Search
CPC ... G06F 16/93; G06F 113/048; G05B 13/048; G06N 3/08; G06T 5/001
See application file for complete search history.

(56) References Cited

U.S. PATENT DOCUMENTS

| | | | |
|---|---|---|---|
| 6,917,438 B1 * | 7/2005 | Yoda | G06K 9/00993 358/1.15 |
| 8,453,922 B2 | 6/2013 | Ragnet et al. | |
| 8,577,826 B2 | 11/2013 | Berard et al. | |
| 8,693,043 B2 | 4/2014 | Schmidtler et al. | |
| 8,892,562 B2 | 11/2014 | Renders et al. | |
| 9,036,040 B1 * | 5/2015 | Danko | H04N 5/225 348/222.1 |
| 9,233,399 B2 | 1/2016 | Moore et al. | |

(Continued)

OTHER PUBLICATIONS

Platt, John C., "Probabilistic Outputs for Support Vector Machines and Comparisons to Regularize Likelihood Methods", Mar. 26, 1999, 11 pages, Microsoft Research, Redmond, WA.
(Continued)

*Primary Examiner* — Alford W Kindred
*Assistant Examiner* — Tiffany Thuy Bui
(74) *Attorney, Agent, or Firm* — Michael Best & Friedrich LLP (57) ABSTRACT

A system for separating documents in a batch of unseparated documents. In one example, the system comprises a scanner, a display, and an electronic processor. In another example, the system comprises an electronic source, a display, and an electronic processor. The electronic processor is configured to receive, as input, a batch of unseparated documents and apply, image processing to each page in the batch. The electronic processor is also configured to determine, for each pair of consecutive pages in the batch of documents, a probability that pages of the pair of consecutive pages belong to different documents using a predictive model. The electronic processor is further configured to generate a batch of separated documents by providing an indication of a document boundary if the probability generated by the predictive model is above a predetermined threshold.

17 Claims, 9 Drawing Sheets

(56) References Cited

U.S. PATENT DOCUMENTS

| | | | |
|---|---|---|---|
| 2002/0051249 A1* | 5/2002 | Lu | H04N 1/0035 358/505 |
| 2003/0074400 A1* | 4/2003 | Brooks | G06F 16/9535 709/203 |
| 2003/0130993 A1* | 7/2003 | Mendelevitch | G06F 16/353 |
| 2011/0192894 A1* | 8/2011 | Ragnet | G06F 16/93 235/375 |
| 2011/0200256 A1* | 8/2011 | Saubat | G06K 9/2063 382/195 |
| 2012/0127540 A1* | 5/2012 | Moore | B07C 3/14 358/474 |
| 2012/0288166 A1* | 11/2012 | Sun | G06K 9/46 382/118 |
| 2014/0097250 A1* | 4/2014 | Antognini | G06K 7/1404 235/454 |
| 2016/0034556 A1 | 2/2016 | Ravid | |
| 2016/0127599 A1 | 5/2016 | Medicherla et al. | |
| 2017/0351914 A1* | 12/2017 | Zavalishin | G06K 9/6269 |
| 2018/0107887 A1* | 4/2018 | Huber, Jr. | G06K 9/00449 |

OTHER PUBLICATIONS

Elman, Jeffrey L., "Finding Structure in Time", Cognitive Science, (1990), vol. 14, pp. 179-211, University of California, San Diego, CA.

Zadrozny, Bianca et al., "Transforming Classifier Scores into Accurate Multiclass Probability Estimates", 6 pages, Department of Computer Science and Engineering 0114, University of California, San Diego, La Jolla, CA.

Collins-Thompson, Kevyn et al., "A Clustering-Based Algorithm for Automatic Document Separation", 5 pages, School of Computer Science, Carnegie Mellon University, Pittsburgh, PA.

Gallo, Ignazio et al., "Deep Neural Networks for Page Stream Segmentation and Classification", Digital Image Computing: Techniques and Applications (DICTA), 2016 International Conference on. IEEE, (2016), p. 1-7.

Bishop, Christopher M., "Neural Networks for Pattern Recognition", Oxford University Press, Inc., 1995, (pp. 27, 77-85, 230-247, 295-300, and 343-345), Aston University, Bermingham, UK.

\* cited by examiner

| TYPE | WINDOW / FILTER SIZE | NUMBER OF FILTERS | STRIDE | FEATURE MAPS SIZE |
|---|---|---|---|---|
| CONVOLUTION | 7*7 | 4 | 2*2 | 409*289 |
| CONVOLUTION | 5*5 | 8 | 1*1 | 409*289 |
| MAX-POOLING | 2*2 | - | 2*2 | 205*145 |
| CONVOLUTION | 3*3 | 16 | 1*1 | 205*145 |
| MAX-POOLING | 2*2 | - | 2*2 | 103*73 |
| CONVOLUTION | 3*3 | 32 | 1*1 | 103*73 |
| MAX-POOLING | 2*2 | - | 2*2 | 52*37 |
| CONVOLUTION | 3*3 | 64 | 1*1 | 52*37 |
| MAX-POOLING | 2*2 | - | 2*2 | 26*19 |
| CONVOLUTION | 3*3 | 12 8 | 1*1 | 26*19 |
| MAX-POOLING | 2*2 | - | 2*2 | 13*10 |
| CONVOLUTION | 3*3 | 256 | 1*1 | 13*10 |
| MAX-POOLING | 2*2 | - | 2*2 | 7*5 |
| AVG-PLOOING | 7*5 | - | 1*1 | 1*1 |

FIG. 9

SYSTEM FOR THE AUTOMATIC SEPARATION OF DOCUMENTS IN A BATCH OF DOCUMENTS

BACKGROUND

Embodiments relate to the automatic separation of documents in a batch of unseparated documents.

SUMMARY

Documents are often scanned into a computer system in batches. The documents in a batch are not separated unless a person has manually inserted separator pages between the documents before the documents are scanned. Manually inserting separator pages into a batch of documents is a time consuming and expensive process. Embodiments relate to a system and a method for autonomously separating a batch of scanned documents by providing indications of document boundaries between pages. Certain embodiments relate to a method for using a neural network that does not rely on character recognition to determine where to provide indications of document boundaries.

Prior-art systems follow different approaches. For example, U.S. Pat. No. 8,892,562 (herein after referred to as "Renders") discloses a method and system for calculating a categorization score vector for each page in a batch of unseparated documents in order to categorize the pages in a batch of unseparated documents into a particular document category. To generate a categorization score for each page, Renders discloses performing several calculations, including calculating a probability that there is a document boundary between a current page and a subsequent page and a probability that there is a document boundary between a preceding page and a current page. A document boundary exists between two consecutive pages belonging to different documents. Each page (excluding the first page and the last page in a batch) is assigned two boundary probabilities. These boundary probabilities are used as weighing factors in a calculation performed to generate the category score vector. The category score vector is used by a labeler to label the individual document pages and segment the sequence of pages into documents.

Renders discloses that document boundaries may be determined with a document boundary detector that is trained using learning methods, including artificial neural networks. According to Renders, the document boundary detector may include a boundary detection model. Renders discloses that several boundary detection models could be applied by the boundary detector. Renders states that the boundary detection model that determines the probability that two consecutive pages do not belong to the same document compares the topical/lexical similarity of the two consecutive pages. In contrast, certain embodiments compare the visual similarity of the two consecutive pages to determine the probability that the two consecutive pages do not belong to the same document.

Renders discloses that the boundary detection model may be trained on labeled document pages where the labels indicate whether the page is at a document boundary or not. In contrast, certain embodiments describe a predictive model trained on pairs of pages that are either consecutive pages in a document or a last page of one document and a first page of another document. Additionally, certain embodiments below describe a specific training set used to train the predictive model. Renders does not describe a specific training set used to train the boundary detection model Renders discloses.

Regarding other prior approaches, U.S. Pat. No. 8,693,043 (herein after referred to as "Schmidtler") discloses inserting separator pages between documents and sub documents in a batch of scanned documents. Schmidtler discloses accomplishing the separation of documents by creating a Finite State Machine (FSM) and traversing the FSM in a "greedy" fashion to classify pages as belonging to one document or another. A probability that a page belongs to a document is calculated for each document the page could possibly belong to. Schmidtler cites Bishop and other documents that describe a way to compute the probability that a page belongs to a document using a neural network, but does not describe a method for training the neural network. The calculated probabilities are assigned to each path of the FSM for each page in the batch. The system described by Schmidtler traverses the FSM in a "greedy fashion" in order to assign each page to a document. If a page belongs to a different form/document than the previous page in the batch, a separator page is inserted between the page and the previous page.

Schmidtler discloses calculating the probability that a page belongs to a document. In contrast, the certain embodiments herein provide a system and method for determining the probability that two consecutive pages in a batch belong to different documents using a neural network. Schmidtler also discloses creating a FSM to determine where to insert separator pages into a batch of documents. In contrast, certain embodiments herein describe providing indications of document boundaries if the probability that two consecutive pages in a batch belong to different documents is above a certain threshold.

One embodiment provides a system for separating documents in a batch of unseparated documents. The system comprises a scanner, a display, and an electronic processor electrically connected to the scanner and the display. In some embodiments, the electronic processor is configured to receive, as input from the scanner, a batch of scanned documents that are unseparated and apply, image processing to each page in the batch of scanned documents. In other embodiments, the electronic processor is configured to receive the batch of unseparated documents from an electronic source, for example, an e-mail server, a secure file transfer protocol (SFTP) server, or the like. The electronic processor is also configured to determine, for each pair of consecutive pages in the batch of unseparated documents, a probability that pages of the pair of consecutive pages belong to different documents using a predictive model. The predictive model is trained using a training set of pairs of pages. A first percent of the pairs of pages are pages that belong to the same document, a second percent of the pairs of pages are pages that belong to different documents that are from a single source, and a remaining percent of the pairs of pages are pages that belong to different documents that are from different sources. The electronic processor is further configured to generate a batch of separated documents by providing an indication of a document boundary if the probability that pages of a pair of consecutive pages belong to different documents is above a predetermined threshold. The electronic processor performs at least one selected from a group of displaying, via the display, the batch of separated documents, storing, in a memory of the electronic processor, the batch of separated documents, and transmitting the batch of separated documents.

Another embodiment provides a system for separating documents in a batch of unseparated documents. The system comprises a scanner, a display, and an electronic processor electrically connected to the scanner and the display. In some embodiments, the electronic processor is configured to receive, as input from the scanner, a batch of scanned documents that are unseparated and apply, image processing to each page in the batch of scanned documents. In other embodiments, the electronic processor is configured to receive the batch of unseparated documents from an electronic source, for example, an e-mail server, a secure file transfer protocol (SFTP) server, or the like. The electronic processor is also configured to determine, for each pair of consecutive pages in the batch of unseparated documents, a probability that pages of the pair of consecutive pages belong to different documents using a convolutional network and generate a batch of separated documents by providing an indication of a document boundary if the probability that pages of a pair of consecutive pages belong to different documents is above a predetermined threshold. The electronic processor also performs at least one selected from a group of displaying, via the display, the batch of separated documents, storing, in a memory of the electronic processor, the batch of separated documents, and transmitting the batch of separated documents.

Another embodiment provides a method for separating documents in a batch of unseparated documents. The method includes receiving, as input, the batch of unseparated documents and applying, with an electronic processor, image processing to each page in the batch of documents. The method also includes determining, for each pair of consecutive pages in the batch of documents, a probability that pages of the pair of consecutive pages belong to different documents using a predictive model. The predictive model is trained using a training set of pairs of pages. A first percent of the pairs of pages are pages that belong to the same document, a second percent of the pairs of pages are pages that belong to different documents that are from a single source, and a remaining percent of the of the pairs of pages are pages that belong to different documents that are from different sources. The method also includes generating, with the electronic processor, a batch of separated documents by providing an indication of a document boundary if the probability that pages of a pair of consecutive pages belong to different documents is above a predetermined threshold and performing at least one selected from a group of displaying, via a display, the batch of separated documents, storing, in a memory of the electronic processor, the batch of separated documents, and transmitting the batch of separated documents.

These and other embodiments will be described and understood in relation to the drawings described below.

DETAILED DESCRIPTION

One or more embodiments are described and illustrated in the following description and accompanying drawings. These embodiments are not limited to the specific details provided herein and may be modified in various ways. Further, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. In addition, some embodiments described herein may include one or more electronic processors configured to perform the described functionality by executing instructions stored in a non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Relational terms such as first and second, top and bottom, and the like may be used herein solely to distinguish one entity or action from another entity or action without necessarily requiring or implying any actual such relationship or order between such entities or actions.

Figure 1:
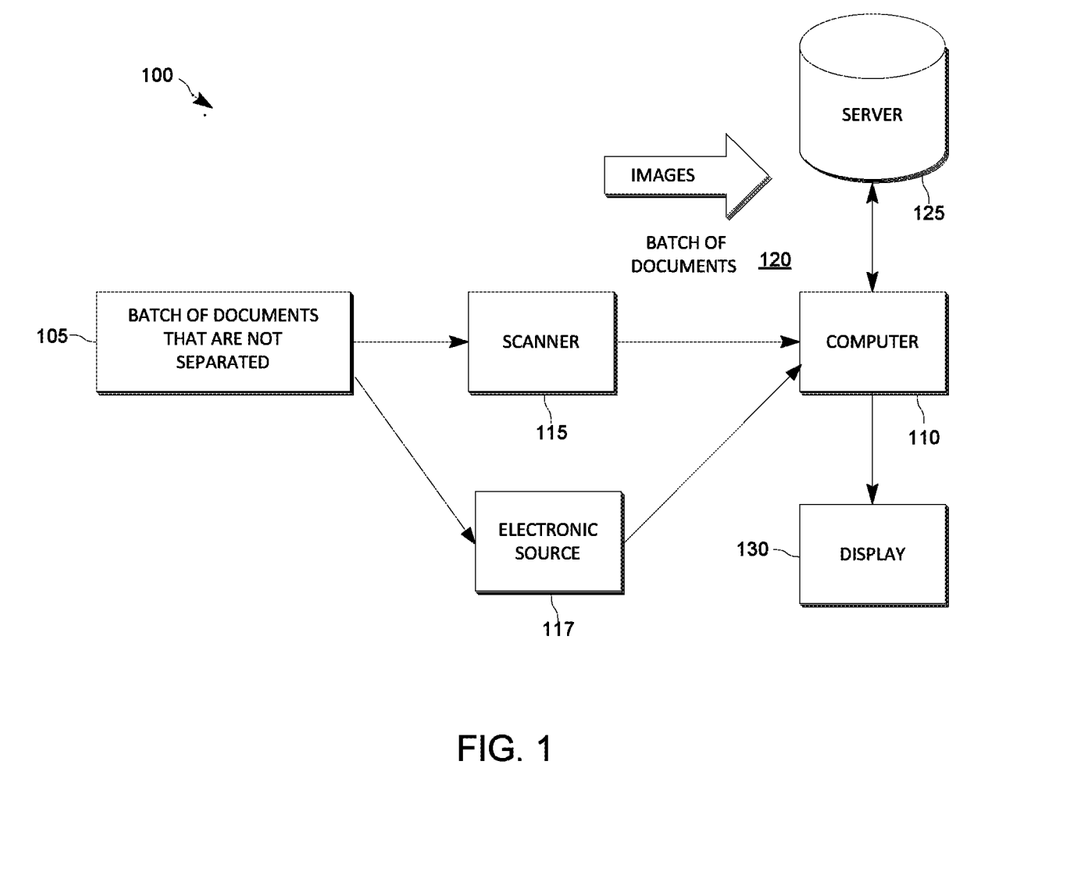
FIG. 1 is a block diagram of a system for separating documents in a batch of unseparated documents.

FIG. 1 is a block diagram illustrating a system 100 for separating documents in a batch of unseparated documents. In FIG. 1, this is illustrated as a batch of documents 105. A document is, in general, a set of pages having the same origin (e.g., the same source), having the same destination, and related to the same topic or subject. For example, a document may be an invoice, a sales order, an order confirmation, a remittance advice, and the like. In some embodiments, an entity, such as a manufacturing company or service company provides the batch of documents 105. Multiple entities can provide multiple batches of documents. In other words, for example, entity A provides batch A and entity B provides a different batch, batch B. Within an entity, documents can come from multiple sources. The documents in the batch of documents 105 can have the same origin or different origins. The batch of documents 105 does not contain indications of document boundaries, which are described later. The pages of the batch of documents 105 have not been labeled in a way that allows a computer 110 or similar device to identify through, for example, character recognition, which document of the plurality of documents each of the pages belongs to. For example, the pages have not been stamped with an identifying mark nor have the pages been labeled with digits. In some embodiments, the batch of documents 105 is a batch of scanned documents that is input to the computer 110 by means of a scanner 115. In other embodiments, the batch of documents 105 is input to the computer 110 from an electronic source, for example, a secure file transfer protocol (SFTP), an e-mail server, or the like. Generally, the number of pages in the batch is limited by the computer's storage capacity and processing power. The scanner 115 converts the pages of the batch of documents 105 to images, in a format such as, for example, PDF, TIFF, JPEG, NMP, GIF, PNG, RAW, or the like, and sends a batch of scanned documents 120 to the computer 110. Hereinafter the term "page" is used in reference to the pages of a batch of scanned documents and thus refers to an image of a page and not a physical page (for example, a paper page). The computer 110 is configured to provide indications of pages between which a document boundary exists. A document boundary is where one document begins and another document ends. Indications of document boundaries are, for example, at least one selected from a group consisting of separator pages, page flags, and a file containing locations of document boundaries. Separator pages are an image in a format such as, for example, PDF, TIFF, JPEG, NMP, GIF, PNG, RAW, or the like. Page flags are markers that are placed on pages that are a first page or a last page of a document in the batch of scanned documents 120. The separator pages, page flags, and the file may include information regarding documents that they separate. For example, a separator page may include information related to a document that the separator page marks the beginning of A separator page may also include information regarding a document that the separator page marks the end of. The information may include, for example, a number of pages in a document, a source of the document, and the like. After providing indications of the document boundaries in the batch of scanned documents 120 the computer 110 may transmit a batch of separated documents to a server 125, store the batch of separated documents in memory, and/or display the batch of separated documents via a display 130.

Figure 2:
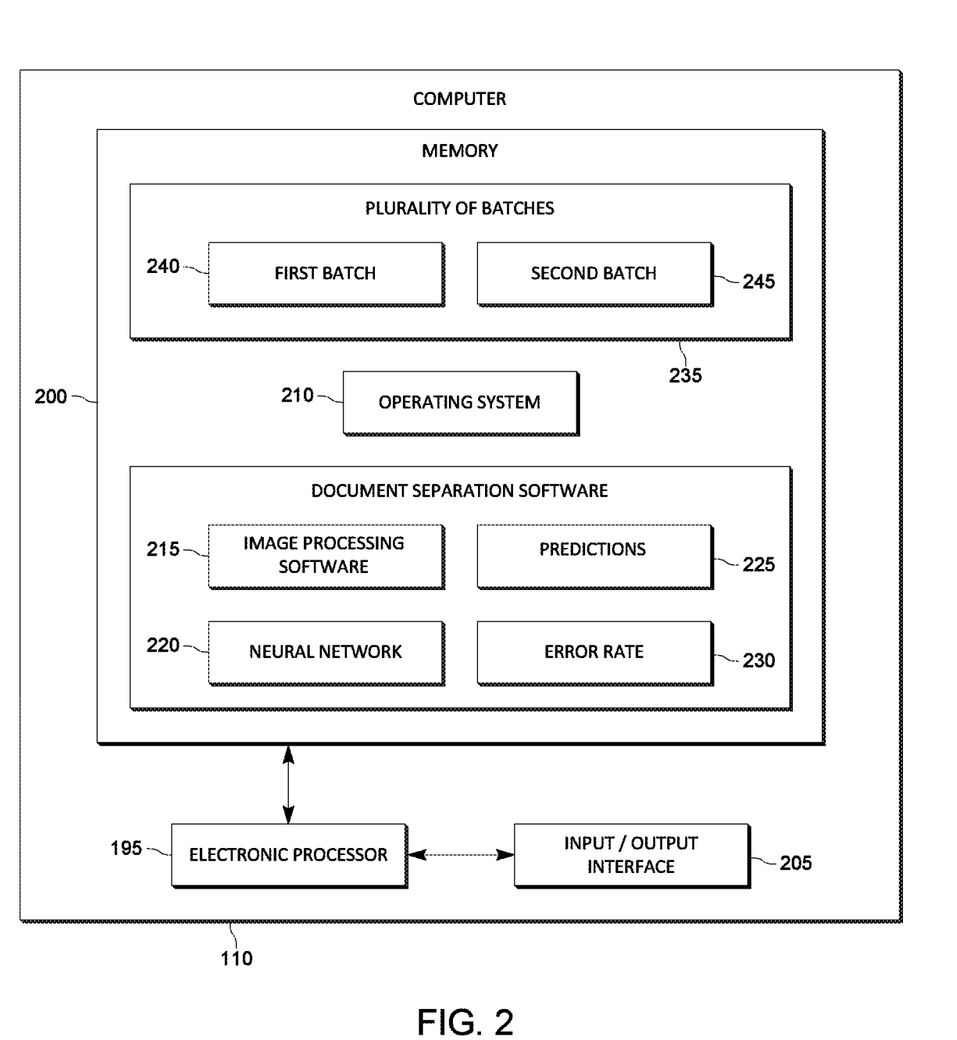
FIG. 2 is a block diagram of an electronic processor of the computer of FIG. 1.

FIG. 2 is a block diagram of the computer 110 of FIG. 1. The computer 110 includes an electronic processor 195. In the embodiment shown, the electronic processor 195 is electrically connected or otherwise communicatively coupled to a memory 200. The memory 200 may include read-only memory ("ROM"), random access memory ("RAM"), electrically erasable programmable read-only memory ("EEPROM"), flash memory, or the like. The computer 110 also includes an input/output interface 205 that is communicatively coupled to the electronic processor 195. The input/output interface 205 allows the computer 110 to communicatively connect to a plurality of devices including the scanner 115, the electronic source 117, the server 125, and the display 130. The connections between the computer 110 and the plurality of devices may be wired or wireless.

In the example illustrated, the memory 200 includes, among other things, an operating system 210, an image processing software 215, a neural network (or predictive model) 220, predictions 225, and an error rate or error rate data 230 of or for the neural network 220. In one example, the neural network 220 is trained to calculate a probability that pages of a pair of consecutive pages belong to different documents. The predictions 225 are made regarding whether the pages of a pair of consecutive pages belong to, or are associated with, different documents. The predictions 225 are made by the electronic processor 195 based on the probabilities calculated by the neural network 220.

The computer 110 also has stored in its memory 200 a plurality of batches of scanned documents 235. The electronic processor 195 has the capability to provide, for each of the plurality of batches of scanned documents 235, indications of document boundaries. Some of the batches of the plurality of batches of scanned documents 235 have been processed by the electronic processor 195. The batches of scanned documents that have been processed by the electronic processor 195, for example a first batch of scanned documents 240, include indications of document boundaries. Some of the batches of the plurality of batches of scanned documents 235 have not been processed by the electronic processor 195. The batches of scanned documents that have not been processed by the electronic processor 195, for example a second batch of scanned documents 245, do not include indications of document boundaries.

Figure 3:
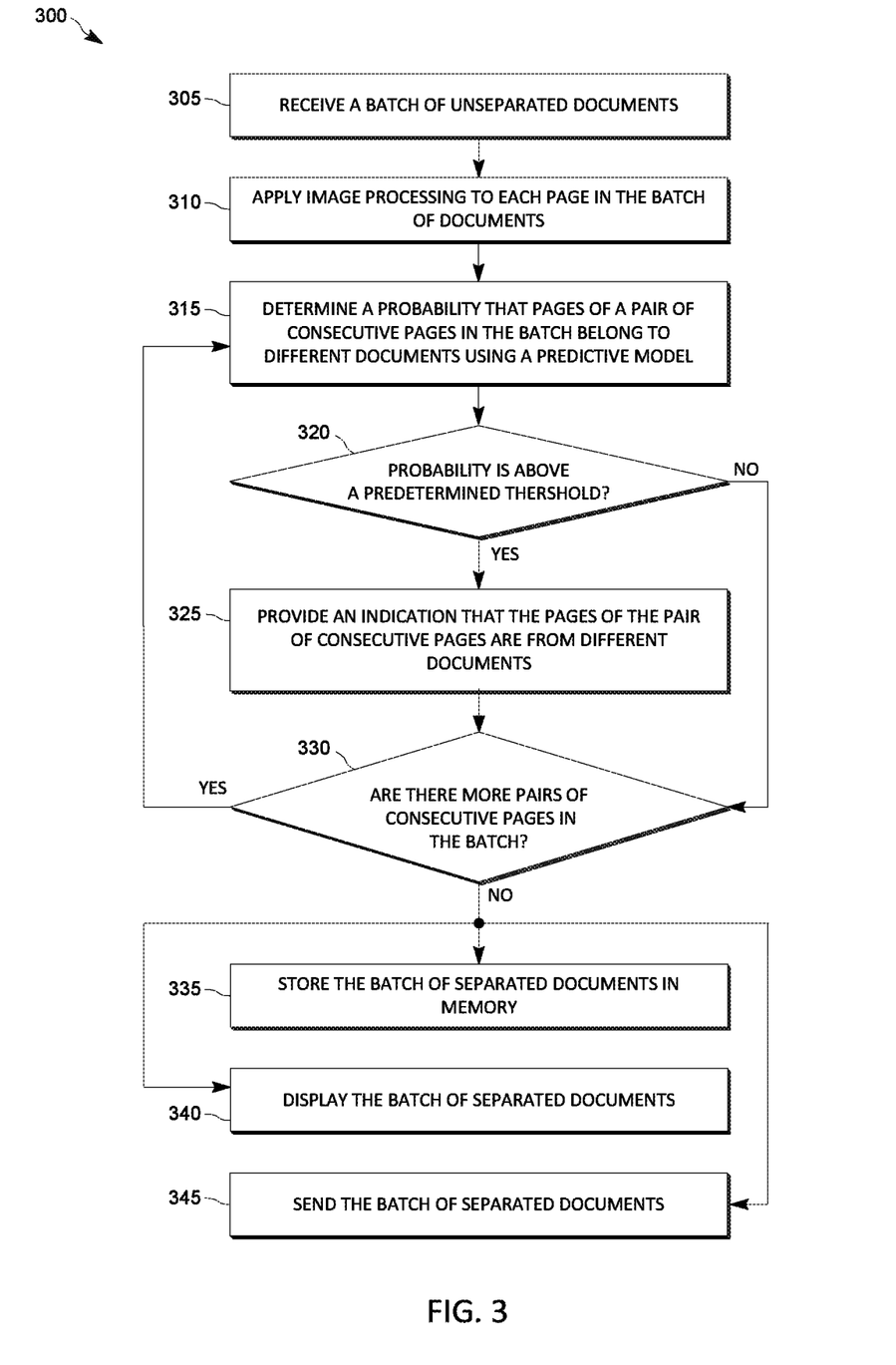
FIG. 3 is a flow chart of a method for separating documents in a batch of scanned documents that are unseparated.

FIG. 3 is a flow chart of an example method 300 for separating documents in a batch of scanned documents that are unseparated. The computer 110 and, more particularly, electronic processor 195 receives the batch of scanned documents 120 from the scanner 115 (block 305). In the example illustrated, the electronic processor 195, using the image processing software 215, applies image processing to each of the pages of the batch of scanned documents 120 (block 310) in order to generate pages with a specific number of pixels, reduce the time it takes to execute the method 300, and improve the error rate 230 of the neural network 220. The electronic processor 195 uses the neural network 220 to determine the probability that two consecutive pages belong to two different documents (block 315). The probability that two consecutive pages belong to two different documents has a range from 0 to 1. If the probability that two consecutive pages belong to different documents is greater than a predetermined threshold (for example 0.5) (block 320) the electronic processor 195 predicts that the two consecutive pages are associated with two different documents and provides an indication of a document boundary (block 325). If the probability that two consecutive pages belong to different documents is less than or equal to a predetermined threshold of (for example 0.5) (block 320) the electronic processor 195 predicts that the two consecutive pages are associated with the same document and does not provide an indication of a document boundary.

It is possible to modify the neural network 220 so that the neural network 220 outputs the probability that pages of a consecutive pair of pages belong to the same document. If the neural network 220 is modified to output the probability that pages of a consecutive pair of pages belong to the same document, the electronic processor 195 is configured to provide an indication of a document boundary when the neural network 220 outputs a probability below a predetermined threshold and not to provide an indication of a document boundary when the neural network 220 outputs a probability above a predetermined threshold.

If there are pairs of consecutive pages in the batch of scanned documents 120 that the electronic processor 195 has yet to make a prediction for (block 330), the electronic processor 195 repeats the process for a next pair of consecutive pages in the batch of scanned documents 120. If there are no more pairs of consecutive pages in the batch of scanned documents 120 that the electronic processor 195 has yet to make a prediction for (block 330), the electronic processor 195 stores the batch of separated documents into memory 200 (block 335), outputs the batch of separated documents to the display 130 (block 340), and/or transmits (or sends) the batch of separated documents to the server 125 (block 345).

Figure 4:
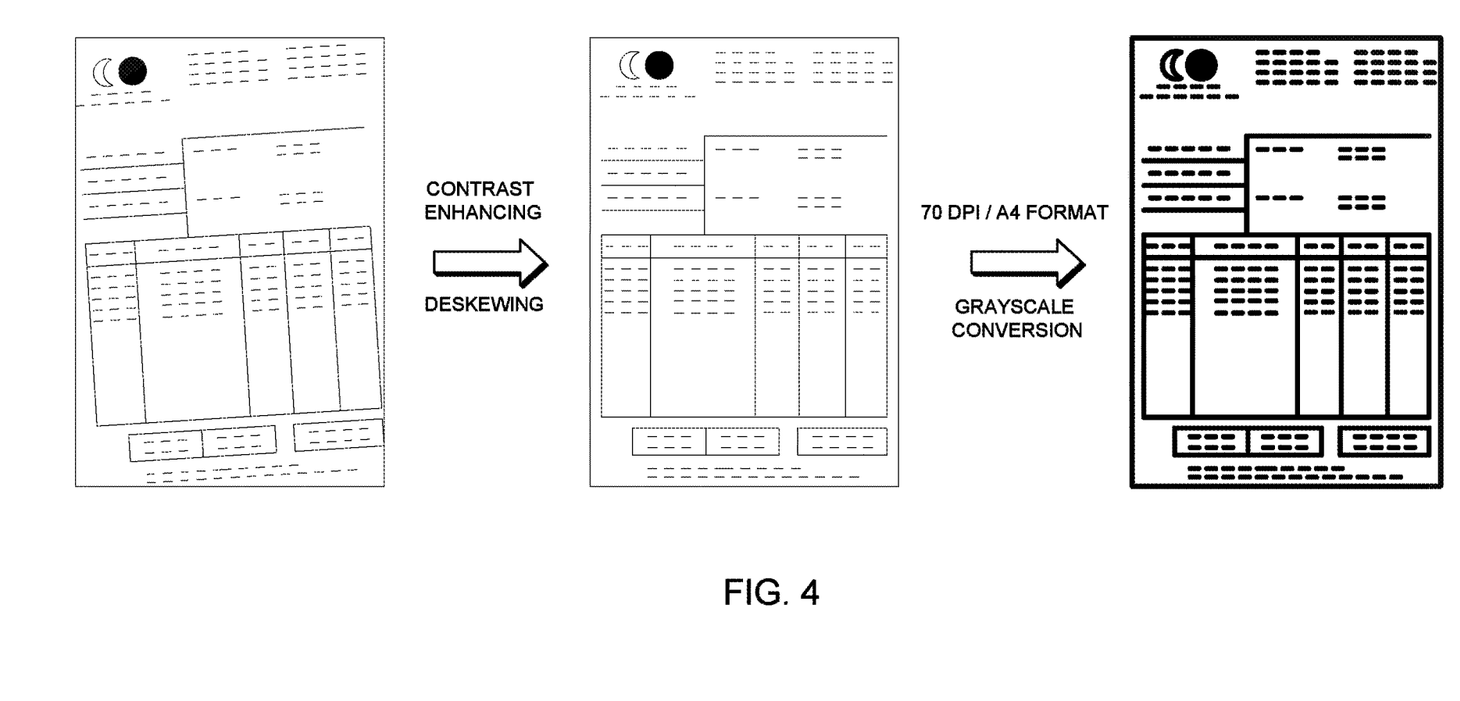
FIG. 4 is an illustration of the image processing applied to each page in a batch of scanned documents that are unseparated.

FIG. 4 is an illustration of the image processing that is performed by the electronic processor 195. In one embodiment, image processing is applied to each page in the batch of scanned documents 120 using the image processing software 215. In some instances, contrast enhancement and deskewing is applied to each page. In some instances, the pages are reformatted. Reformatting the pages insures that they are the same size and have the same number of pixels. For example, in some embodiments, each page is converted to A4 paper format and downscaled or up scaled to 70 dots per inch (dpi). In other embodiments, conversions to different formats may be carried out and downscaling or up scaling to different resolutions is performed. Pages in A4 paper format with 70 dpi have a height of 818 pixels and a width of 578 pixels. In some instances, the pages are converted to a gray scale. For example, in some embodiments the pages are converted to a grayscale with 256 levels of gray. In other embodiments, conversions to other levels of gray are performed. In other instances, the pages are converted to levels of color.

Figure 5:
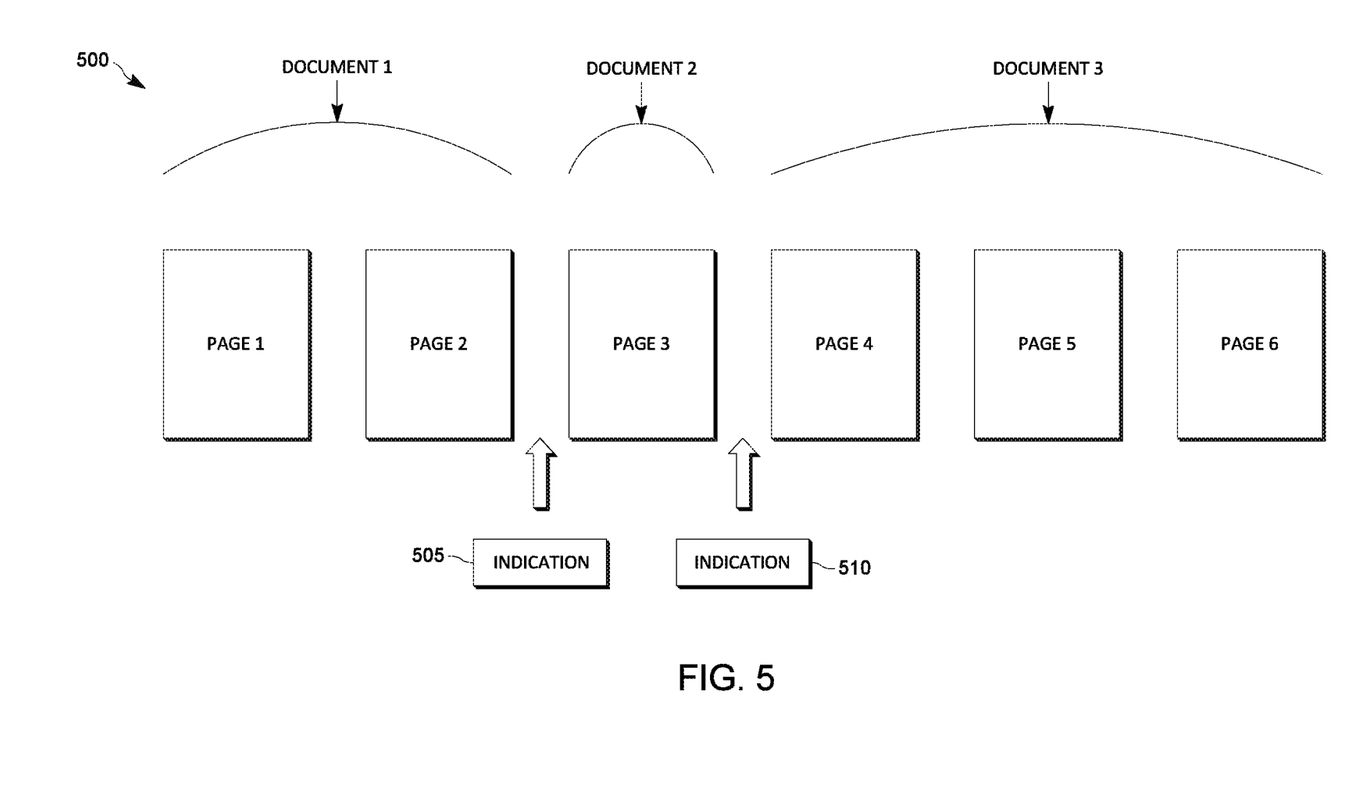
FIG. 5 is an illustration of the method of FIG. 3 used to separate documents in an example batch of scanned documents that are unseparated.

FIG. 5 illustrates an example of a batch of scanned documents 500 for which the electronic processor 195 provides indications of document boundaries. In the example illustrated, once the electronic processor 195 has applied image processing to the pages in the batch of scanned documents 500 the electronic processor 195 begins to separate the pages in the batch of scanned documents 500 into documents. The electronic processor 195 inputs the image data of the first page and the second page to the neural network 220. The image data of a page includes, for example, a position of each pixel within the page and a color/shade of each pixel. In the illustrated example, the electronic processor 195 inputs the image data of Page 1 and Page 2 into the neural network 220. The neural network 220 uses the image data of each page of the pair of consecutive pages to calculate the probability that the pages of the pair of consecutive pages are from different documents. If the probability that the pages of the pair of consecutive pages are from different documents is below a predetermined threshold, the electronic processor 195 determines that the pages are associated with the same document and does not provide an indication of a document boundary. If the probability that the pages of the pair of consecutive pages is above a predetermined threshold, the electronic processor 195 determines that the pages are associated with different documents and provides an indication of a document boundary. In the illustrated example, given the image data of Page 1 and Page 2, the neural network 220 returns a probability below a predetermined threshold, for example 0.5. Therefore, the electronic processor 195 associates Page 1 and Page 2 with the same document (Document 1) and does not provide an indication that there is a document boundary between Page 1 and Page 2.

If there are pages remaining in the batch of scanned documents 120, the electronic processor 195 repeats the aforementioned sequence of steps with a next pair of consecutive pages in the batch of scanned documents 500. The second page of the pair of consecutive pages is a first page of the next pair of consecutive pages. A second page of the next pair of consecutive pages is a page in the batch of scanned documents 500 directly following the second page of the pair of consecutive pages. For instance, in the illustrated example the next pair of consecutive pages includes Page 2 and Page 3. In the illustrated example, the electronic processor 195 inputs the image data of Page 2 and Page 3 to the neural network 220. The neural network 220 analyzes the visual features of Page 2 and Page 3 and returns a probability greater than a predetermined threshold, for example 0.5. Therefore, the electronic processor 195 determines that Page 2 and Page 3 are associated with different documents (Document 1 and Document 2, respectively) and provides an indication 505 that there is a document boundary between Page 2 and Page 3. An indication marks the end of one document and the beginning of another. In the illustrated example, the indication 505 marks the end of Document 1 and the beginning of Document 2.

In the illustrated example, the electronic processor 195 continues to provide indications of document boundaries in the batch of scanned documents 500. The electronic processor 195 provides Page 3 and Page 4 as input to the neural network 220. The neural network 220 analyzes the visual features of Page 3 and Page 4 and returns a probability greater than the predetermined threshold, for example 0.5. Therefore, the electronic processor 195 determines that Page 3 and Page 4 are associated with different documents (Document 2 and Document 3, respectively) and provides an indication 510 that Page 3 and Page 4 are from different documents. The indication 510 marks the end of Document 2 and the beginning of Document 3. The electronic processor 195 inputs to the neural network 220 the image data of the remaining pairs of pages in the batch of scanned documents 500. The neural network 220 outputs a probability below a predetermined threshold, for example 0.5, for the remaining pairs of pages. Therefore, the electronic processor 195 associates Page 4, Page 5, and Page 6 with Document 3. After determining that Page 6 is associated with Document 3 the electronic processor 195 recognizes that it has reached the end of the batch of scanned documents 500. The electronic processor 195 outputs a batch of separated documents and/or stores the batch of separated documents into memory 200.

Figure 6:
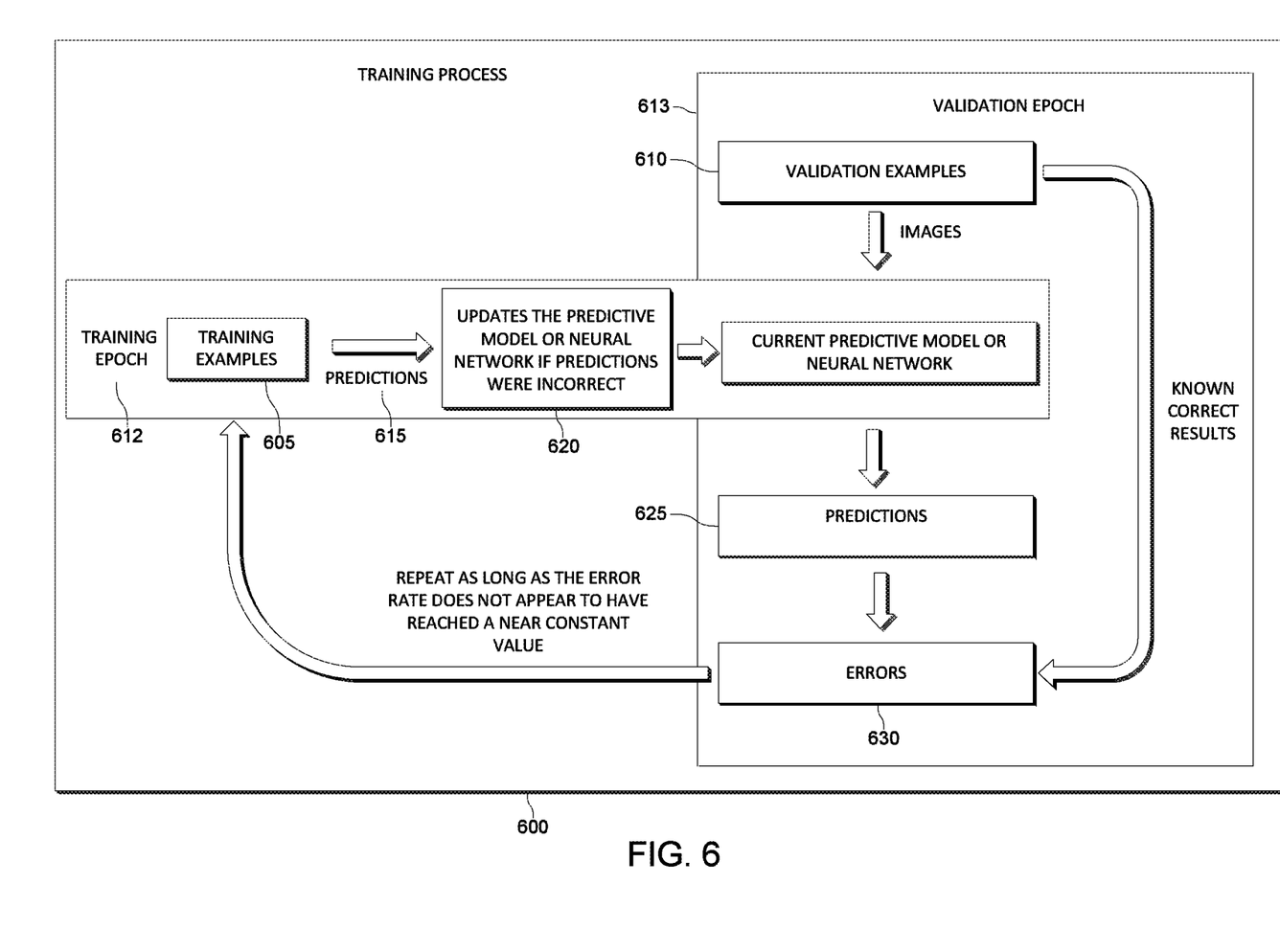
FIG. 6 is an illustration of a process used to train the neural network of the system of FIG. 1.

FIG. 6 is a graphical illustration of a process for training the neural network 220 (block 600) in accordance with one embodiment. In the example illustrated, the process is used to train the neural network 220 to calculate a probability that two consecutive pages in the batch of scanned documents 120 belong to different documents. A learning dataset is developed that is comprised of pairs of pages that may or may not belong to the same document. Image processing has been applied to each page of the pairs of pages in the learning data. The pairs of pages that do not belong to the same document are comprised of a last page of a document and a first page of a different document (that, in this example, are documents from the same entity). It is known which pairs of pages are from the same document and which pairs of pages are from different documents. The known correct result for each pair of pages is stored in the memory 200 of the computer 110. The pairs of pages that make up the learning dataset are chosen so that a first percent, for example forty percent, of the pairs of pages are consecutive pages from the same document, a second percent, for example forty percent, of the pairs of pages are from different documents but are from a single source (or the same origin), and a remaining percent, for example twenty percent, of the pairs of pages are from different documents and different sources (or different origins). In other embodiments, the data distribution may be different than the example of forty percent, forty percent, and twenty percent that is provided above. In some embodiments, the data distribution is based on batches of documents received from the entities. For example, if the batches of documents rarely contain multipage documents then a larger percent of the learning dataset will be pairs of pages from different documents. In some embodiments, the learning dataset is split so that roughly eighty five (85) percent of the pairs of pages in the learning data set form a training set 605 of training examples (pairs of pages) and the remaining fifteen (15) percent of the pairs of pages in the learning dataset form a validation set 610 of validation examples (pairs of pages). In some embodiments, no more than a predetermined threshold of roughly seven and a half (7.5) percent of the pairs of pages that make up the learning data set are from a single entity. A training epoch 612 is defined as having been completed once the neural network 220 calculates a probability for every training example in the training set 605. A validation epoch 613 is defined as having been completed once the neural network 220 calculates a probability for every validation example in the validation set 610.

In one embodiment, the neural network 220 calculates the probability that two consecutive pages belong to different documents for each pair of consecutive pages in the training set 605. After the electronic processor 195 makes a prediction about a consecutive pair of pages based on the probability calculated by the neural network 220, the prediction is checked against the known correct result (block 615). If the prediction that the electronic processor 195 makes based on the probability calculated by the neural network 220 does not match the known correct result, weights in the neural network 220 are adjusted (block 620). If the prediction that the electronic processor 195 makes based on the probability calculated by the neural network 220 matches the known correct result, no changes are made to the neural network 220. Once the neural network 220 calculates the probability for each pair of pages in the training set 605, the neural network 220 calculates a probability for each pair of pages in the validation set 610. After the neural network 220 calculates a probability for every pair of pages in the validation set 610 the electronic processor 195 makes predictions 225 based on the probabilities calculated by the neural network 220 (block 625). The electronic processor 195 compares the predictions 225 it makes, using the probabilities calculated by the neural network 220 for every pair of pages in the validation set 610, to the known correct results for the pairs of pages (block 630).

Comparing the known correct results to the predictions 225 allows the electronic processor 195 to determine the error rate 230 of the neural network 220. The error rate 230 for the neural network 220 decreases asymptotically, approaching a near constant value, as the number of training epochs and validation epochs performed for the neural network 220 increases. The electronic processor 195 determines the error rate 230 of the neural network 220 and stores the error rate 230 in memory 200 after each validation epoch 613. If the error rate 230 does not appear to have reached a near constant value, the electronic processor 195 performs another training epoch 612 and another validation epoch 613. If the error rate 230 appears to have reached the near constant value, the electronic processor 195 determines that the process of training the neural network 220 (block 600) is complete.

Figure 7:
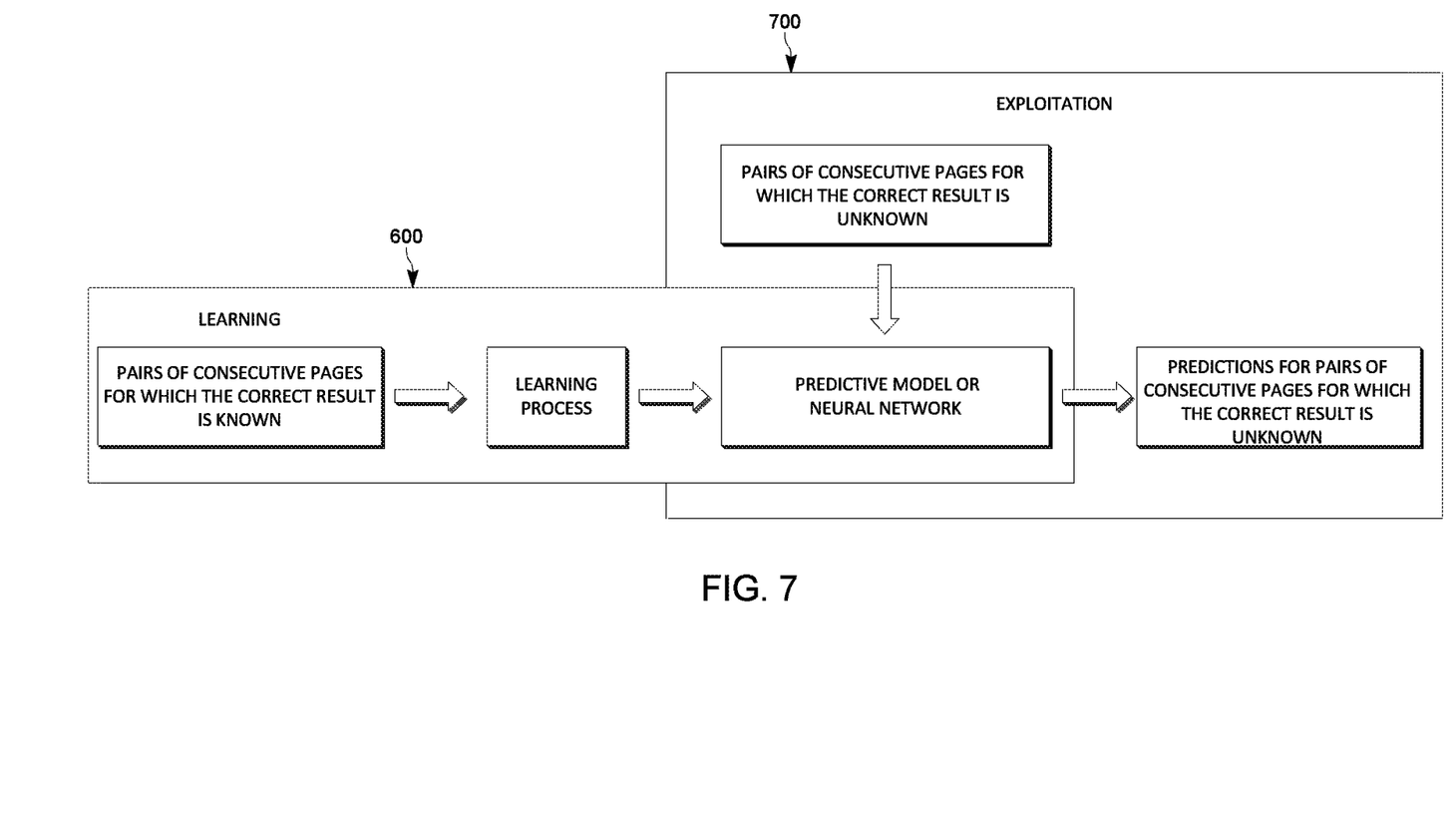
FIG. 7 is an illustration of one example of how the neural network of the system of FIG. 1 is used.

Once the training process (block 600) is complete, the neural network 220 can be used to determine the probability that pairs of pages (that have not been previously processed) are from different documents (block 700). The process of training the neural network 220 with pairs of pages that have been identified as belonging or not belonging to different documents (block 600) and then making predictions 225 for pairs of pages that have not been identified as belonging or not belonging to different documents (block 700) is illustrated in FIG. 7.

The neural network 220 can be trained to calculate probabilities for pairs of pages in batches of scanned documents from a variety of entities. The neural network 220 can also be trained to calculate probabilities for pairs of pages in batches of scanned documents from a specific entity. The neural network 220 is trained to calculate probabilities for the pairs of pages in batches of scanned documents from a specific entities by first being trained with a first training set containing training examples of pairs of pages from a variety of entities and then being trained with a second training set containing training examples of pairs of pages from only the specific entity.

In some embodiments the computer 110 receives feedback from a user regarding the predictions 225 made by the electronic processor 195. The electronic processor 195 uses the feedback from the user to improve the neural network 220. For example, if the feedback from the user indicates that the electronic processor 195 incorrectly provided an indication of a document boundary between the pages of a pair of consecutive pages in the batch of scanned documents 120, the electronic processor 195 adjusts weights of the neural network 220. The weights of the neural network 220 are adjusted in a manner is likely to improve the accuracy of the probabilities output by the neural network 220. Therefore, the accuracy of the predictions 225 that the electronic processor 195 makes is also likely to improve.

Figure 8:
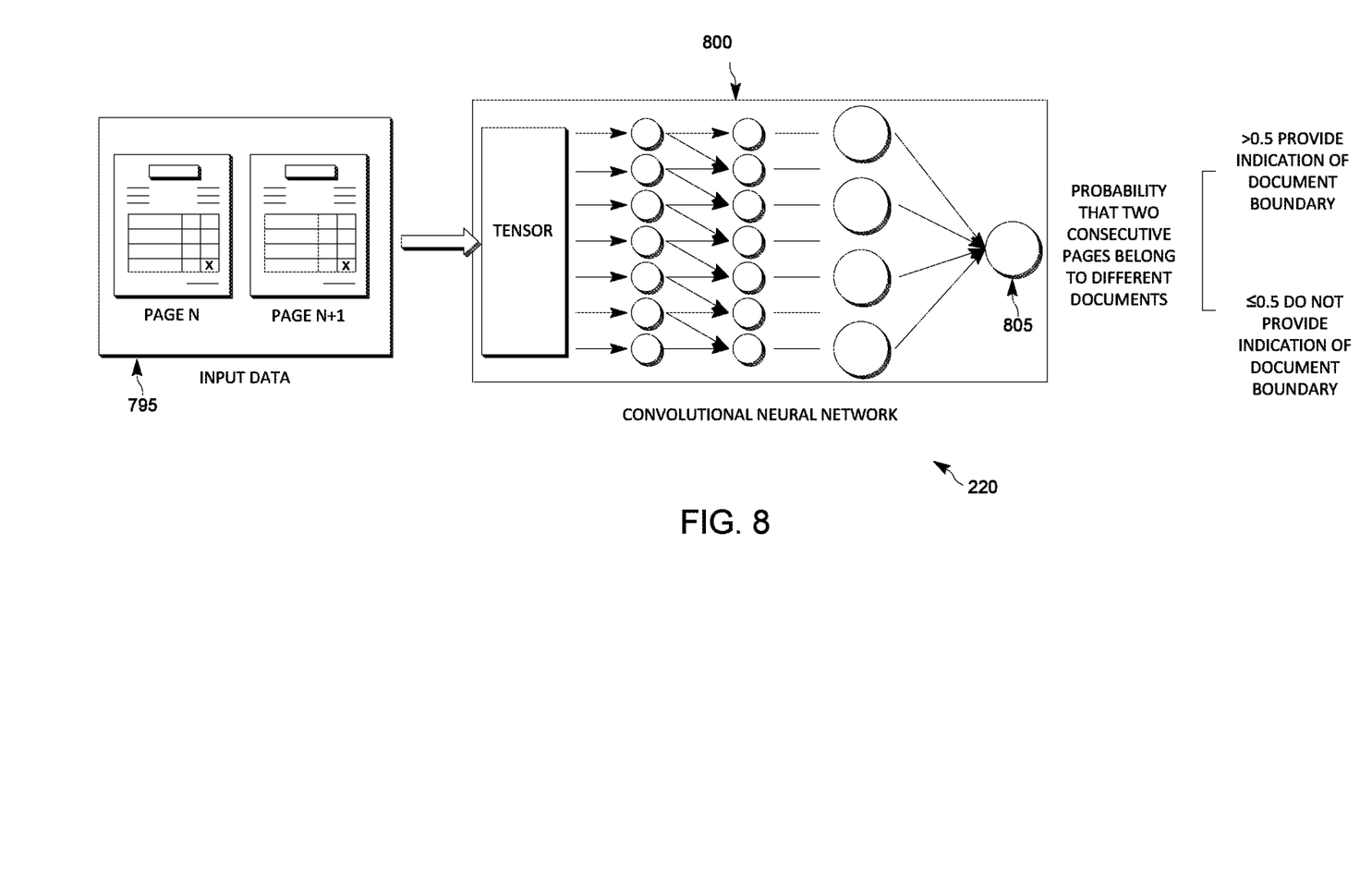
FIG. 8 is an illustration of one example of the neural network of the system of FIG. 1.

FIG. 8 is an illustration of the neural network 220 in accordance with one embodiment. In the example illustrated, the neural network 220 is a deep convolutional neural network. In the particular example provided, two consecutive pages are placed side by side and input to the neural network 220 as a single image 795. In other embodiments, two consecutive pages are input to the neural network 220 using other methods. For example, a first page of the pair of consecutive pages is provided as input to a first set of neurons in a first layer of the neural network 220 and a second page of the pair of consecutive pages is provided as input to a second set of neurons in the first layer of the neural network 220. The image 795 is formed by a plurality of pixels. A pixel is defined by its position in the page and its shade. For example, if the images have been converted to 256 levels of gray each pixel will have a value between 0 and 256 assigned to it that indicates the shade of the pixel ranging from black to white.

The neural network 220 has a plurality of layers including multiple abstraction layers 800 and one decision layer 805. Each layer in the neural network 220 is made up of a plurality of nodes. Nodes in each layer of the neural network 220 are connected to nodes in a next layer of the neural network. In some embodiments, nodes in a layer of the neural network 220 are connected to the nodes in a previous layer forming feedback loops.

There are two types of abstraction layers—convolutional layers and pooling layers. Each convolutional layer applies filters to the image 795. In certain embodiments, a filter is a matrix of weight values. The weight values of the filters are adjusted in the training process. Each filter represents a feature in the image 795. For example, a feature of the image 795 may be an ellipse, an arc, or a vertical line. Each succeeding convolutional layer of the neural network 220 detects higher level features than the previous convolutional layer. For example, if a first convolutional layer of the neural network 220 detects straight lines in the image 795 then the next convolutional layer detects squares in the image 795. Pooling layers reduce the size of the image being processed by the neural network 220. A pooling layer creates a smaller image from a larger image by creating the smaller image with pixels that represent groups of pixels in the larger image. For example, a maximum pooling layer uses a pixel, with the largest value of amongst pixels in a group of pixels in the larger image, to represent the group of pixels in the smaller image. In another example, an average pooling layer uses a pixel, assigned an average of the values of each pixel in a group of pixels in the larger image, to represent the group of pixels in the smaller image. The one decision layer 805 is responsible for using the features at each of the multiple abstraction layers 800 to determine the probability that two consecutive pages belong to different documents.

Figure 9:
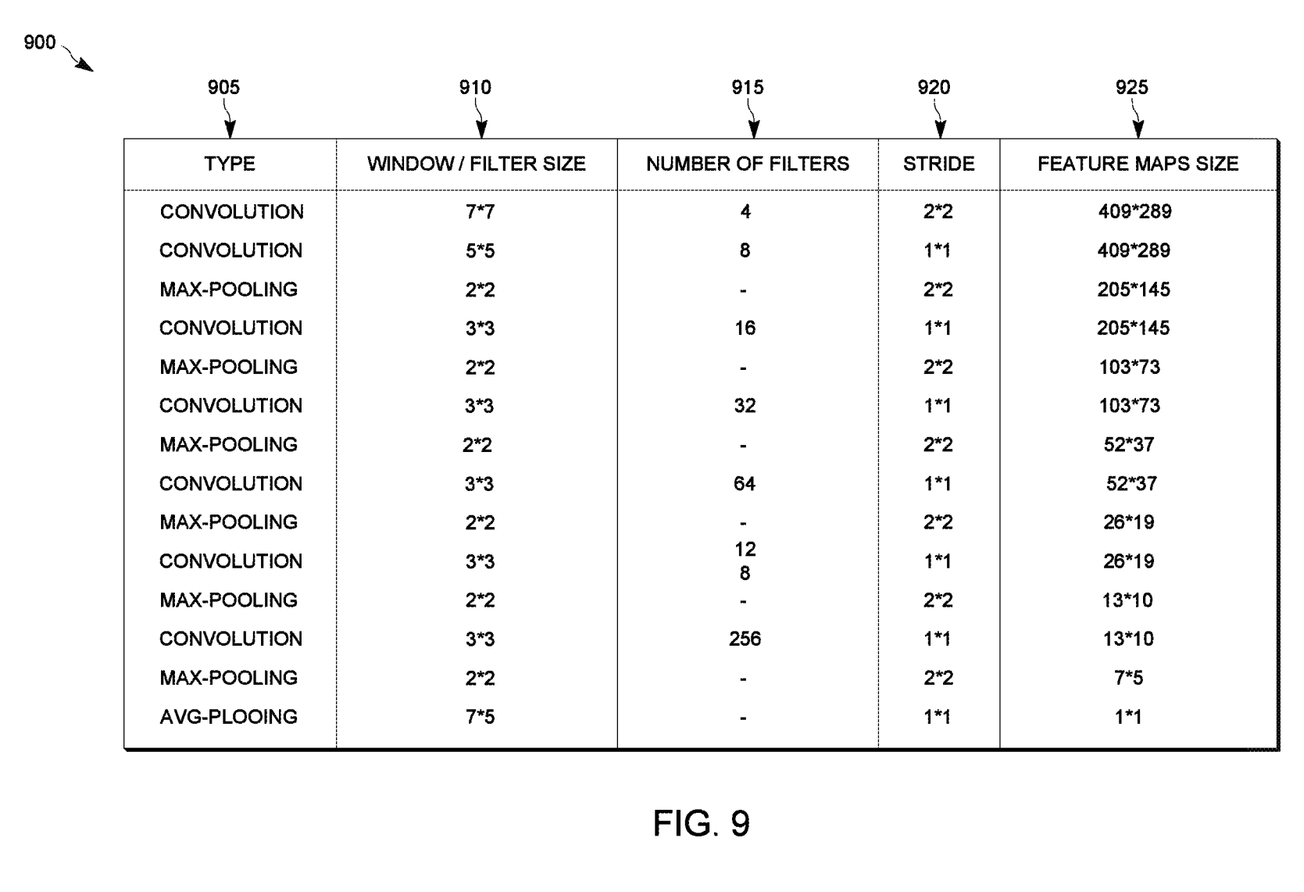
FIG. 9 is a table of features for one example of the neural network of FIG. 1.

An example of values used to create the neural network 220 is illustrated in the table 900 of FIG. 9. In the example illustrated, the neural network 220 is a deep convolutional neural network. Each row of the table 900 represents an abstraction layer of the neural network 220. In the neural network 220 illustrated in FIG. 9 there are fourteen abstraction layers. Seven of the abstraction layers are convolutional layers and seven of the abstraction layers are pooling layers. In column 910 the size of the filters is given for each convolutional layer and the size of a group (or window) of pixels in the larger image to be represented by a single pixel in the smaller image is given for each pooling layer. In column 915 the number of filters in each convolutional layer is given. In column 920 a stride used in each layer is given. The stride is the number of pixels the filter or window is moved before it is reapplied to the image. For example, in a convolutional layer a seven pixel by seven pixel filter is applied to the pixels of an image in columns one through seven and rows one through seven. If the convolutional layer has a stride of 2 then the filter will be applied to the pixels of the image in columns three through nine and rows three through nine next. Column 925 gives the size of the image (or feature map) output by each layer.

Various features and advantages of the invention are set forth in the following claims.

The invention claimed is:

1. A system for separating documents in a batch of unseparated documents, each document in the batch of unseparated documents having a source entity, the system comprising:
a display; and
an electronic processor electrically connected to the display and configured to
receive, as input, the batch of unseparated documents;
apply, image processing to each page in the batch of documents;
determine, for each pair of consecutive pages in the batch of documents, a probability that pages of the pair of consecutive pages belong to different documents using a predictive model, wherein a first image of a first page of the pair of consecutive pages and a second image of a second page of the pair of consecutive pages are input to the predictive model, and wherein the probability is based on the source entity of each of the first page of the pair of consecutive pages and the second page of the pair of consecutive pages;
generate a batch of separated documents by providing an indication of a document boundary if the probability that pages of a pair of consecutive pages belong to different documents is above a predetermined threshold; and
perform at least one selected from a group of displaying, via the display, the batch of separated documents, storing, in a memory of the electronic processor, the batch of separated documents, and transmitting the batch of separated documents;
wherein the predictive model is trained using a training set of pairs of pages and a first percent of the pairs of pages are pages that belong to the same document, a second percent of the pairs of pages are pages that belong to different documents that are from a single source entity, and a remaining percent of the of the pairs of pages are pages that belong to different documents that are from different source entities;
wherein the predictive model is a deep convolutional neural network, and
wherein the first percent is forty percent of the pairs of paces, the second percent is forty percent of the pairs of pages, and the remaining percent is twenty percent of the pairs of pages.

2. The system according to claim 1 wherein, the probability that pages of the consecutive pair of pages belong to different documents has a range from 0.0 to 1.0 and the predetermined threshold is within the range.

3. The system according to claim 2 wherein, the predetermined threshold is 0.5.

4. The system according to claim 1 wherein, applying image processing to each page in the batch of documents includes:
downscaling each page;
deskewing each page;
converting each page to a gray scale; and
applying contrast enhancing to each page.

5. The system according to claim 1 wherein, the system further includes a scanner and the electronic processor is electrically connected to the scanner and configured to receive, as input from the scanner, a batch of scanned documents that are unseparated.

6. A method for separating documents in a batch of unseparated documents, each document in the batch of unseparated documents having a source entity, the method comprising:
receiving, as input, the batch of unseparated documents;
applying, with an electronic processor, image processing to each page in the batch of documents;
determining, for each pair of consecutive pages in the batch of documents, a probability that pages of the pair of consecutive pages belong to different documents using a predictive model, wherein a first image of a first page of the pair of consecutive pages and a second image of a second page of the pair of consecutive pages are input to the predictive model, and wherein the probability is based on the source entity of each of the first page of the pair of consecutive pages and the second page of the pair of consecutive pages;

generating, with the electronic processor, a batch of separated documents by providing an indication of a document boundary if the probability that pages of a pair of consecutive pages belong to different documents is above a predetermined threshold; and performing at least one selected from a group of displaying, via a display, the batch of separated documents, storing, in a memory of the electronic processor, the batch of separated documents, and transmitting the batch of separated documents;

wherein the predictive model is trained using a training set of pairs of pages and a first percent of the pairs of pages are pages that belong to the same document, a second percent of the pairs of pages are pages that belong to different documents that are from a single source entity, and a remaining percent of the of the pairs of pages are pages that belong to different documents that are from different source entities;

wherein the predictive model is a deep convolutional neural network, and wherein the first percent is forty percent of the pairs of pages, the second percent is forty percent of the pairs of panes, and the remaining percent is twenty percent of the pairs of pages.

7. The method according to claim 6 wherein, the probability that pages of the consecutive pair of pages belong to different documents has a range from 0.0 to 1.0 and the predetermined threshold is within the range.

8. The method according to claim 7 wherein, the predetermined threshold is 0.5.

9. The method according to claim 6 wherein, applying image processing to each page in the batch of documents includes:
 downscaling each page;
 deskewing each page;
 converting each page to a gray scale; and
 applying contrast enhancing to each page.

10. The method according to claim 9 wherein, each page is downscaled to 70 dots per inch (dpi) in A4 paper format.

11. The method according to claim 9 wherein, the gray scale has 256 levels of gray.

12. The method according to claim 6 wherein, the predictive model is trained to provide an indication that the pages of the pair of consecutive pages belong to different documents for documents from various source entities.

13. The method according to claim 6 wherein, the predictive model is trained to provide an indication that the pages of the pair of consecutive pages belong to different documents for documents from a specific source entity.

14. The method according to claim 13 wherein, the predictive model is first trained using examples from a variety of source entities and then trained using examples from the specific entity.

15. The method according to claim 6 wherein, the indication of the document boundary is at least one selected from a group consisting of separator pages, page flags, and a file containing locations of document boundaries.

16. The method according to claim 6 wherein, a percent of the pairs of pages of the predictive model that are from a single source entity is equal to or below a predetermined threshold.

17. A system for separating documents in a batch of unseparated documents, each document in the batch of unseparated documents having a source entity, the system comprising:
 a display; and an electronic processor electrically connected to the display and configured to
 receive, as input, the batch of unseparated documents;
 apply, image processing to each page in the batch of documents;
 determine, for each pair of consecutive pages in the batch of documents, a probability that pages of the pair of consecutive pages belong to different documents using a predictive model, and wherein the probability is based on the source entity of each of the first page of the pair of consecutive pages and the second page of the pair of consecutive pages;
 generate a batch of separated documents by providing an indication of a document boundary if the probability that pages of a pair of consecutive pages belong to different documents is above a predetermined threshold; and
 perform at least one selected from a group of displaying, via the display, the batch of separated documents, storing, in a memory of the electronic processor, the batch of separated documents, and transmitting the batch of separated documents;
 wherein the predictive model is trained to provide an indication that the pages of the pair of consecutive pages belong to different documents for documents from a specific source entity by first training the predictive model using examples from a variety of source entities and then training the predictive model using examples from the specific source entity;
 wherein the predictive model is a deep convolutional neural network.

* * * * *